(12) United States Patent
McBrearty et al.

(10) Patent No.: US 7,853,812 B2
(45) Date of Patent: Dec. 14, 2010

(54) REDUCING POWER USAGE IN A SOFTWARE APPLICATION

(75) Inventors: Gerald Francis McBrearty, Austin, TX (US); Ian Damain Romanick, Portland, OR (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 11/672,058

(22) Filed: Feb. 7, 2007

(65) Prior Publication Data

US 2008/0189562 A1 Aug. 7, 2008

(51) Int. Cl.
G06F 1/26 (2006.01)
G06F 1/32 (2006.01)

(52) U.S. Cl. .......... 713/320; 713/300; 713/340

(58) Field of Classification Search ......... 713/300, 713/320, 340
See application file for complete search history.

(56) References Cited

U.S. PATENT DOCUMENTS

| | | | | |
|---|---|---|---|---|
| 5,944,829 | A * | 8/1999 | Shimoda | 713/324 |
| 6,148,408 | A * | 11/2000 | Shimoda | 713/320 |
| 6,289,399 | B1 * | 9/2001 | Furuichi et al. | 710/6 |
| 7,134,029 | B2 * | 11/2006 | Hepner et al. | 713/300 |
| 7,185,211 | B2 * | 2/2007 | Loughran | 713/300 |
| 2003/0014742 | A1 | 1/2003 | Seth et al. | |
| 2005/0081073 | A1 * | 4/2005 | Williams | 713/320 |
| 2005/0102539 | A1 * | 5/2005 | Hepner et al. | 713/300 |
| 2005/0110783 | A1 | 5/2005 | Sklovsky et al. | |
| 2005/0114850 | A1 | 5/2005 | Chheda et al. | |
| 2005/0138442 | A1 | 6/2005 | Keller et al. | |
| 2005/0138450 | A1 | 6/2005 | Hsieh | |
| 2007/0067136 | A1 * | 3/2007 | Conroy et al. | 702/130 |
| 2007/0136617 | A1 * | 6/2007 | Kanno et al. | 713/320 |
| 2007/0220293 | A1 * | 9/2007 | Takase | 713/320 |
| 2008/0104430 | A1 * | 5/2008 | Malone et al. | 713/300 |
| 2009/0313490 | A1 * | 12/2009 | Tani | 713/320 |

OTHER PUBLICATIONS

Paul Yao, "Power Management Features of Windows CE .NET," available at http://msdn.microsoft.com/en-us/library/ms836788.aspx, Aug. 2002.*
Atmel AVR 25/45/85 8-bit Microcontroller 2/4/8k Bytes InSystem Programmable Flash.*
Dietz et al., "Compiler and Runtime Support for Predictive Control of Power And Cooling", 20th International Parallel and Distributed Processing Symposium, 2006, IPDPS 2006, pp. 1-8.
Manthuruthil et al., "Automated Configuration for Country Specific Software Packages", Technical Disclosure Bulletin vol. 36, No. 10, Oct. 1993, pp. 379-380.

* cited by examiner

*Primary Examiner*—Thomas Lee
*Assistant Examiner*—Jaweed A Abbaszadeh
(74) *Attorney, Agent, or Firm*—Yee & Associates, P.C.; Steven L. Bennett

(57) ABSTRACT

A computer implemented method, an apparatus, and computer usable program code for reducing the amount of power used when executing a set of applications is provided. A controller determines an operating condition for the data processing system. Responsive to the operating condition being above a threshold, the controller switches the set of applications to a low power path. Responsive to the operating condition being below the threshold and the set of applications operating at the low power path, the controller switches the set of applications to a normal operating path.

17 Claims, 4 Drawing Sheets

REDUCING POWER USAGE IN A SOFTWARE APPLICATION

BACKGROUND OF THE INVENTION

1. Field of the Invention

The present invention relates generally to an improved data processing system. Specifically, the present invention relates to an improved thermal system in a data processing system. Still more specifically, the present invention relates to a computer implemented method, an apparatus, and computer usable program code for reducing the amount of power used by a data processing system when executing a set of applications.

2. Description of the Related Art

With a growing emphasis on extending battery life in a mobile computer, the software industry is increasingly focused on creating software that helps mobile computers run in a more economical manner. Battery life is directly related to the number of operations the mobile computer is executing at one time. The more operations being executed, the more power required, thereby reducing the life of a battery.

A number of solutions currently exist to reduce the number of operations performed by a data processing system when executing an application. One solution is to identify the power consumption level of an application and recompile the parts of the application that are consuming the most power. In recompiling, this solution switches the most power-consuming part of the application to an alternative algorithm so that less power is used. However, this type of solution does not allow for a power usage reduction in applications that have already been compiled and are already running.

Another solution is to insert power down instructions within an application when the power levels of the data processing system exceed a particular level. However, this solution only allows for applications to run in an "on" or "off" state. The application does not provide an alternative low power state.

Yet another solution is to reduce the pixel depth of an image by masking particular data lines at predetermined times. However, this solution is limited to only those applications that involve graphics, such as a video game or other similar application.

SUMMARY OF THE INVENTION

A computer implemented method, an apparatus, and computer usable program code for reducing the amount of power used by a data processing system when executing a set of applications is provided. A controller determines an operating condition for the data processing system. Responsive to the operating condition being above a threshold, the controller switches the set of applications to a low power path. Responsive to the operating condition being below the threshold and the set of applications operating at the low power path, the controller switches the set of applications to a normal operating path.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
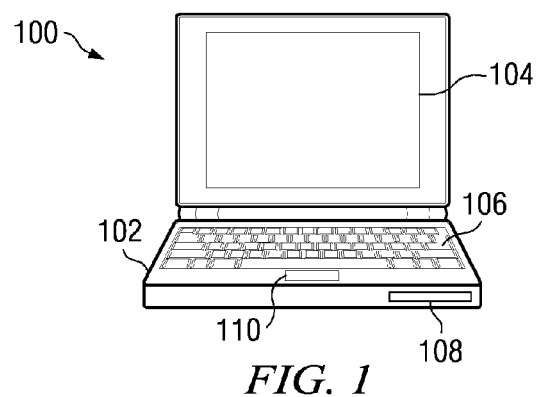
FIG. 1 is a pictorial representation of a data processing system in which illustrative embodiments may be implemented.

With reference now to the figures and in particular with reference to FIG. 1, a pictorial representation of a data processing system in which illustrative embodiments may be implemented is depicted. Mobile computer 100 is depicted which includes system unit 102, video display terminal 104, keyboard 106, storage devices 108, which may include floppy drives and other types of permanent and removable storage media, and pointer device 110. Additional input devices may be included with mobile computer 100, such as, for example, a mouse, a joystick, a touch screen, a trackball, a microphone, and the like. Mobile computer 100 man be implemented using any suitable computer, such as an IBM Thinkpad computer, which is a product of International Business Machines Corporation, located in Armonk, N.Y. Computer 100 also preferably includes a graphical user interface (GUI) that may be implemented by means of systems software residing in computer readable media in operation within computer 100.

Figure 2:
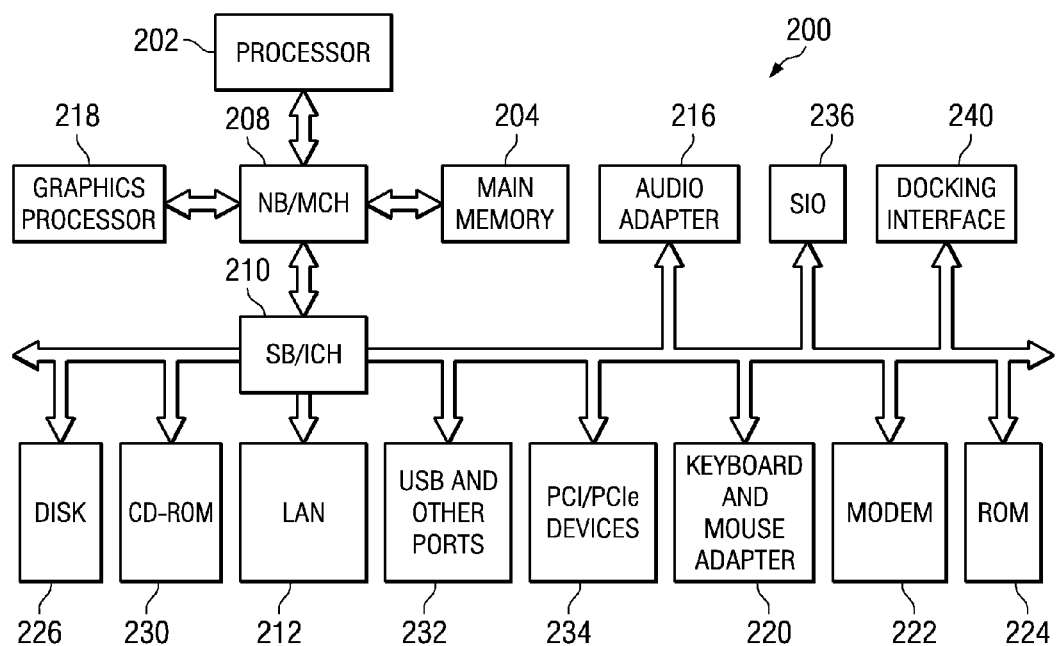
FIG. 2 depicts a block diagram of a data processing system in which illustrative embodiments may be implemented.

With reference now to FIG. 2, a block diagram of a data processing system is shown in which illustrative embodiments may be implemented. Data processing system 200 is an example of a mobile computer, such as computer 100 in FIG. 1, in which code or instructions implementing the processes for different embodiments may be located. In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 are connected to MCH 208. Graphics processor 218 may be connected to the MCH through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM drive 230, universal serial bus (USB) and other communications ports 232, and PCI/PCIe devices 234 may be connected to ICH 210. PCI/PCIe devices may include, for example, Ethernet adapters, add-in cards, PC cards for notebook computers, etc. PCI uses a cardbus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210.

Docking interface 240 may also be connected to the ICH. Data processing system 200 may be a mobile computing device, such as a laptop computer or handheld computer. Docking interface 240 provides port replication to allow the data processing system to easily connect to a keyboard, pointing device, monitor, printer, speakers, etc. The docking interface allows the mobile computing device to operate as a desktop computer with the more immobile peripheral devices.

An operating system runs on processor 202 and is used to coordinate and provide control of various components within data processing system 200 in FIG. 2. The operating system may be a commercially available operating system such as Windows XP, which is available from Microsoft Corporation. An object-oriented programming system such as Java™ may run in conjunction with the operating system and provides calls to the operating system from Java™ programs or applications executing on data processing system 200. Java™ is a trademark of Sun Microsystems, Inc. Instructions for the operating system, the object-oriented programming system, and applications or programs are located on storage devices, such as hard disk drive 226, and may be loaded into main memory 204 for execution by processor 202. The processes of the illustrative embodiments are performed by processor 202 using computer implemented instructions, which may be located in a memory such as, for example, main memory 204, memory 224, or in one or more peripheral devices 226 and 230.

Those of ordinary skill in the art will appreciate that the hardware in FIG. 2 may vary depending on the implementation. Other internal hardware or peripheral devices, such as flash memory, equivalent nonvolatile memory, or optical disk drives and the like, may be used in addition to or in place of the hardware depicted in FIG. 2. Also, the processes of the depicted embodiments may be applied to a multiprocessor data processing system.

For example, data processing system 200 may be a personal digital assistant (PDA), which is configured with flash memory to provide non-volatile memory for storing operating system files and/or user-generated data. The depicted example in FIG. 2 and the above-described examples are not meant to imply architectural limitations. For example, data processing system 200 also may be a tablet computer or a telephone device in addition to taking the form of a PDA.

The illustrative embodiments provide a computer implemented method, an apparatus, and computer usable program code for reducing the amount of power used by a data processing system when executing a set of applications. In these examples, a set of applications can be one or more applications. A controller determines an operating condition for a data processing system. A controller can be a software only embodiment, a hardware only embodiment, or a software and hardware embodiment. An operating condition is the internal state of operations for a data processing system. An operating condition can be an operating temperature, the amount of processing power used, the amount of battery power used, the number of applications operating at one time, or the types of applications operating at one time. In response to the operating condition being above a threshold operating condition, the controller switches the set of applications to a low power path. A low power path is the operating condition used to reduce power consumption when a data processing system is above the threshold operating condition. In one embodiment, the low power path is a reduction in the frequency of an operation, such as the number of times an operation is refreshed. In another embodiment, the low power path is a reduction in the number of functions that are available to a user.

In response to the operating condition being below the threshold operating condition and the set of applications operating at the low power path, the controller switches the set of applications to a normal operating path. The normal operating path is the default path by which an application operates. This normal operating path consumes more power than the low power path. In one embodiment, the controller automatically switches the set of applications to a normal operating path. In another embodiment, the user selects whether the set of applications is to run in the low power path or the normal operating path.

In one embodiment, the controller executes a command line switch to switch the set of applications to a low power path. The command line switch changes the set of applications from the normal operating path to the low power path. In another embodiment, the controller executes a compiler flag that initializes a low power path version of the set of applications.

In the illustrative embodiments, a set of applications can include only one low power path or a number of low power paths. If the set of applications includes a number of low power paths, the controller switches the set of applications to the first low power path in response to the operating temperature being above the threshold. In response to the operating condition still being above the threshold after the set of applications switches to the first low power path, the controller switches the set of applications from the first low power path to the next low power path. The next low power path is a power path that generates less power than a previous power path. The controller then determines whether the operating condition is below the threshold in response to switching the set of applications to the next low power path. In response to the operating condition still being above the threshold, the controller repeats the process of switching to the next low power path and determining whether the operating condition is below the threshold until the lowest low power path is reached. In response to the lowest low power path being reached, the controller notifies the user to investigate further. In the alternative, the controller can exit the set of applications.

In the illustrative embodiments, a number of applications can also be simultaneously operating in a data processing system. In this embodiment, the controller selects which application in the set of applications to operate in the low power path. The selected applications form a set of identified applications. The controller then switches the identified applications to the low power path. The controller maintains the normal operating path for other applications in the plurality of applications.

Figure 3:
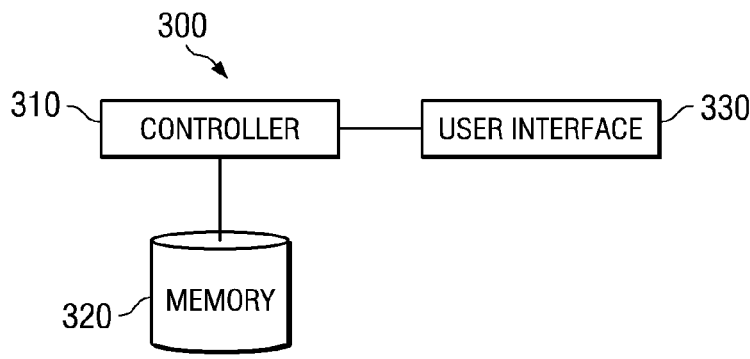
FIG. 3 illustrates a data processing system for adjusting an operating condition, in accordance with an illustrative embodiment.

FIG. 3 illustrates a data processing system for adjusting an operating condition, in accordance with an illustrative embodiment. Data processing system 300 can be implemented as mobile computer 100 of FIG. 1 or data processing system 200 of FIG. 2. Data processing system 300 includes controller 310, memory 320, and user interface 330. In the illustrative embodiment, the components of data processing system 300 are a combination of hardware and software embodiments. However, in alternative embodiments, the components can be a software-only embodiment or a hardware-only embodiment.

Controller 310 manages the operating conditions and temperature of data processing system 300. Controller 310 can be implemented as a processor, similar to processor 202 of FIG. 2. Controller 310 includes instructions for changing the operating conditions with which a particular application executes. An operating condition is the internal state of operations for a data processing system. An operating condition can be an operating temperature, the amount of processing power used, the amount of battery power used, the number of applications operating at one time, or the types of applications operating at one time.

Typically, an application generates a certain amount of heat based on the number of operations or the types of operations being performed by the application. An operation can be defined as a single instruction or group of instructions executed within an application. Example instructions can include, but are not limited to, the drawing of a graphic in a video game, the refresh rate of a webpage, and the functions available to a single user on a webpage.

More operations performed at one time usually equates to more processing capability being used, which in turn typically translates to more heat being generated by a data processing unit such as data processing unit 300. Likewise, fewer operations performed at one time usually equates to less processing capability being used and less heat being generated. The amount of heat generated determines the amount of power that is ultimately consumed and used by data processing system 300. When a high amount of heat is generated, data processing system 300 cools the processing system using a fan or other similar cooling device. The speed and amount of time with which the fan operates is determined by the operating temperature resulting from the heat generation. As the speed and time used to operate the fan increase, the amount of power used also increases, thereby reducing the battery life of data processing system 300. Therefore, in order to increase the battery life of data processing system 300, the amount of power used needs to be decreased, which ultimately means that the amount of heat generated when executing an application needs to be reduced.

In the illustrative embodiment, controller 310 determines when an application should operate in a low power path versus a normal operating path. A path is a set of instructions in an application. A normal operating path is the default path by which an application operates. A low power path, on the other hand, is the operating conditions used when data processing system 300 is operating above a threshold temperature. The low power path can be a reduction in the re-occurrence or frequency of a particular operation. For example, the low power path can be a reduction in the refresh rate of a particular graphic in a video game. In another embodiment, the low power path can be a reduction in the number of functions available to a single user. For example, the normal power path can offer four different types of functions to a customer, but, under the low power path state, only one or two functions are available. In yet another embodiment, the low power path can be a combination of both the reduction in the frequency of a particular operation and the reduction in the number of functions available to a single user.

The threshold temperature is the operating temperature at which data processing system 300 begins to consume power at a rate greater than some selected value. The selected value may be identified in many ways. For example, the selected value may be a rate of power consumption that results in the battery being depleted before a period of time. The period of time may be, for example, the amount of time desired for data processing system 300 to operate, such as one to ten hours.

The threshold temperature can be a default setting, empirically determined, or set by a user. The threshold temperature can be a single temperature or a range of temperatures. Also, data processing system 300 can have a variety of threshold temperatures which vary based on the environmental conditions and usages with which data processing system 300 is operating. For example, data processing system 300 can have one threshold temperature for when a user is operating the laptop computer at a desk and another threshold temperature for when the user operates the laptop computer on the user's lap. In another example, data processing system 300 can have a separate threshold temperature for each separate application that is running. Thus, the threshold temperature can increase or decrease based on the number of applications open at a single time.

In one embodiment, controller 310 executes a command line switch that determines the power path, either the low power path or the normal operating path, for a particular application. The command line switch can be a Boolean statement that includes an "IF" statement and an "ELSE" statement. The command line switch is an indication that an application should change from the default procedure. The command line switch can be an active decision which is instantaneously activated while an application is operating and when the condition for the command line switch occurs.

In another embodiment, controller 310 uses a compiler flag or compiler option to determine the power path for a particular operation. A compiler flag executes when an application compiles or translates an application from programming language to computer language. To compile means to prepare an application to be executed by data processing system 300. In this embodiment, controller 310 uses a Boolean statement to compile different versions of a particular application. Thus, in use, if data processing system 300 is operating above the threshold temperature, then controller 310 compiles the low power path version of the application. On the other hand, if data processing system 300 is operating below the threshold temperature, then controller 310 compiles the default version of the application.

Memory 320 stores the instructions and the data for managing the operating conditions and temperature for data processing system 300. Specifically, memory 320 stores the low power path for a particular application, the normal operating path for a particular application, and the threshold temperature for data processing system 300. Memory 320 can be executed in the main memory of data processing system 300, similar to main memory 204 of FIG. 2, or in a hard drive, similar to disk 226 of FIG. 2. Memory 320 can store data in any format, including but not limited to a table, a flat file, an Extensible Markup Language (XML) file, a relational database management system, or any combination thereof.

User interface 330 executes instructions for presenting an application on a display, such as video display terminal 104 of FIG. 1. User interface 330 presents the application based on the power path with which the application is operating.

Thus, in use, in the illustrative embodiment, controller 310 identifies an operating temperature for data processing system 300. Controller 310 then determines whether the operating temperature is above the threshold temperature. If the operating temperature is above the threshold temperature, then controller 310 switches any applications running at that time to a low power path. The low power path is stored in memory 320. Thus, controller 310 retrieves the instructions for the low power path from memory 320, executes the instructions, and then presents the application in the low power path state to the user on user interface 330. Controller 310 then continues to monitor the operating temperature to determine when the operating temperature returns to below the threshold temperature. Once the operating temperature goes below the threshold temperature, controller 310 switches back to the normal operating path and presents the application in the normal operating path state to the user. If the operating temperature remains above the threshold temperature, then controller 310 can optionally send a warning message to the user of data processing system 300. Additionally, in another embodiment, a user can set controller 310 to automatically exit and shut down an application that continues to remain above the threshold temperature.

In an alternative embodiment, an application may have a number of low power paths that gradually decrease the amount of power used. Thus, when the operating temperature is above the threshold temperature, controller 310 switches to the first low power path. If the operating temperature is still above the threshold temperature, controller 310 then switches to the second low power path which uses less power than the first low power path. If the operating temperature is still above the threshold temperature, controller 310 will then continue to switch to the next low power path until the lowest low power path is reached. If the lowest low power path is reached and the operating temperature is still above the threshold temperature, then controller 310 can notify the user, automatically shut down the application, or take any other appropriate action to prevent damage to data processing system 300.

In the embodiment having a number of low power paths, each low power path can reduce power by reducing the number of functions or by reducing the frequency of an operation. In the situation where the low power path specifies a reduction in both functions and frequency, the determination of whether to reduce the function or frequency first can be a default setting, empirically determined, or established by the user or administrator of data processing system 300. When a conflict between a reduction in frequency and a reduction of functions occurs, the conflict can be resolved by executing a set of instructions that prioritizes the low power paths. Alternatively, the set of instructions can notify the user and request that the user resolve the conflict.

In yet another embodiment, instead of monitoring the operating temperature, controller 310 can monitor any other operating condition that affects the amount of heat being generated, such as the amount of processing power used, the amount of memory used, the amount of battery power used, the number of applications operating at a single time, or the types of application running. In this embodiment, controller 310 switches to the low power path if any of the monitored conditions is above the established threshold condition.

In yet another embodiment, the user can decide whether to operate under the normal operating path or the low power path. In this embodiment, controller 310 can present the user with the option when an application is installed, an application is initialized, or when the user is using the application itself.

In still yet another embodiment, if more than one application is operating at the same time, controller 310 can execute an analysis to determine which application to operate at a low power path and which application to operate at the normal operating path. The determination can be based on a number of factors, including, but not limited to, the application which consumes the most power, the order in which each application was initiated, or the application which has remained unused or static for a longest period of time. Controller 310 can switch one or a number of applications from the normal operating path to the low power path.

The illustrative embodiments are not limited to the illustrated example. For example, data processing system 300 can include more or fewer components. Additionally, data processing system 300 is not limited to a mobile computer and can also be any other type of computer, a personal digital assistant (PDA), a wireless phone, or any other wireless mobile device. Moreover, data processing system 300 is not limited to the type of application executed. Example applications can include, but are not limited to, a video game, a database, a word processor, a spreadsheet, or a media player.

Figure 4:
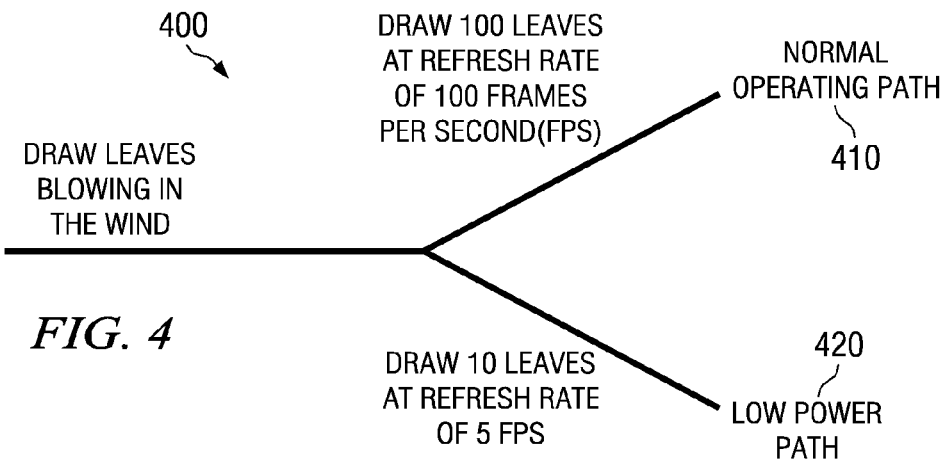
FIG. 4 is an example of a frequency reduction, in accordance with an illustrative embodiment.

FIG. 4 is an example of a frequency reduction, in accordance with an illustrative embodiment. Operation 400 is a set of instructions in an application for drawing leaves that blow in the wind. Operation 400 is executed in a controller, similar to controller 310 of FIG. 3.

Operation 400 includes two paths: normal operating path 410 and low power path 420. Normal operating path 410 is the default path on which the application executes. In the illustrative embodiment, normal operating path 410 draws one hundred (100) leaves at a refresh rate of one hundred (100) frames per second (FPS). Thus, in use, the application operating under normal operating conditions will draw 100 leaves and redraw the 100 leaves every $\frac{1}{100}$ of a second.

Low power path 420 is the operating condition used when a data processing system is operating above a threshold operating condition, such as an operating temperature. If the operating condition is above the threshold operating condition, then the controller switches the application to low power path 420. In the illustrative embodiment, low power path 420 draws ten (10) leaves at a refresh rate of five (5) FPS. Thus, in use, the application operating under low power path 420 will draw 10 leaves and redraw the leaves every $\frac{1}{5}$ of a second.

Figure 5:
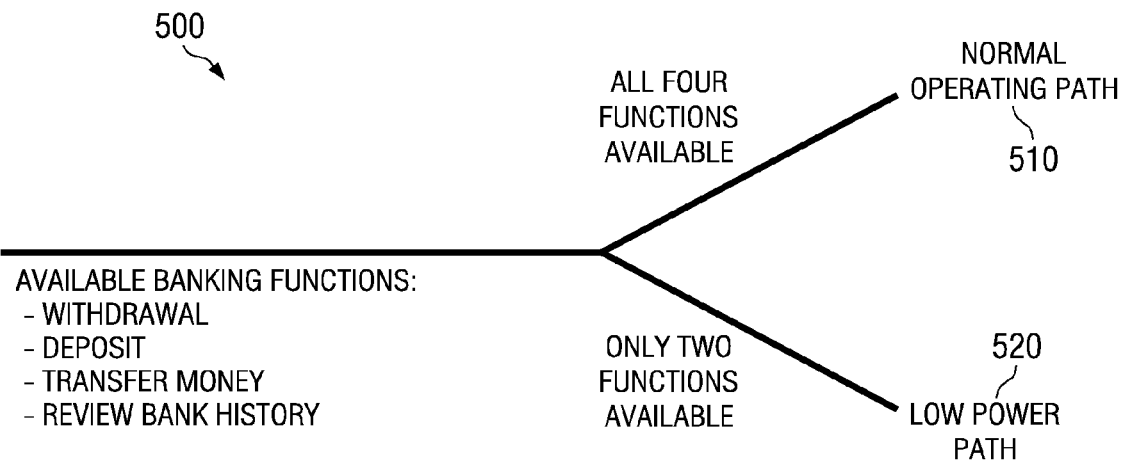
FIG. 5 is an example of a function reduction, in accordance with an illustrative embodiment.

FIG. 5 is an example of a function reduction, in accordance with an illustrative embodiment. Operation 500 is a set of instructions in a webpage that provides four banking options to customer. The banking options are withdrawal, deposit, transfer money, and review bank history. Operation 400 can be executed in a controller, similar to controller 310 of FIG. 3.

As in operation 400 of FIG. 4, operation 500 offers two paths: normal operating path 510 and low power path 520. Under normal operating path 510, all four banking functions are available. On the other hand, when operating under low power path 520, only two of the four banking functions are available. The two banking options can be a static, predetermined set, such as withdrawals and deposits only, or the two banking options can be dynamic and change each time low power path 520 is used. If static, the predetermined set can be determined by the administrator of the website for the bank, be a default setting, or be determined by the customer of the bank. The predetermined set can also be empirically determined based on the frequency of usage of the functions. If dynamic, the determination of which functions are presented and when each function is presented can also be determined by the administrator of the website for the bank, be a default setting, or be determined by the customer of the bank. However, in an alternative embodiment, the determination of which functions are presented in a dynamic setting can also be randomly determined by a set of instructions for the application.

Figure 6:
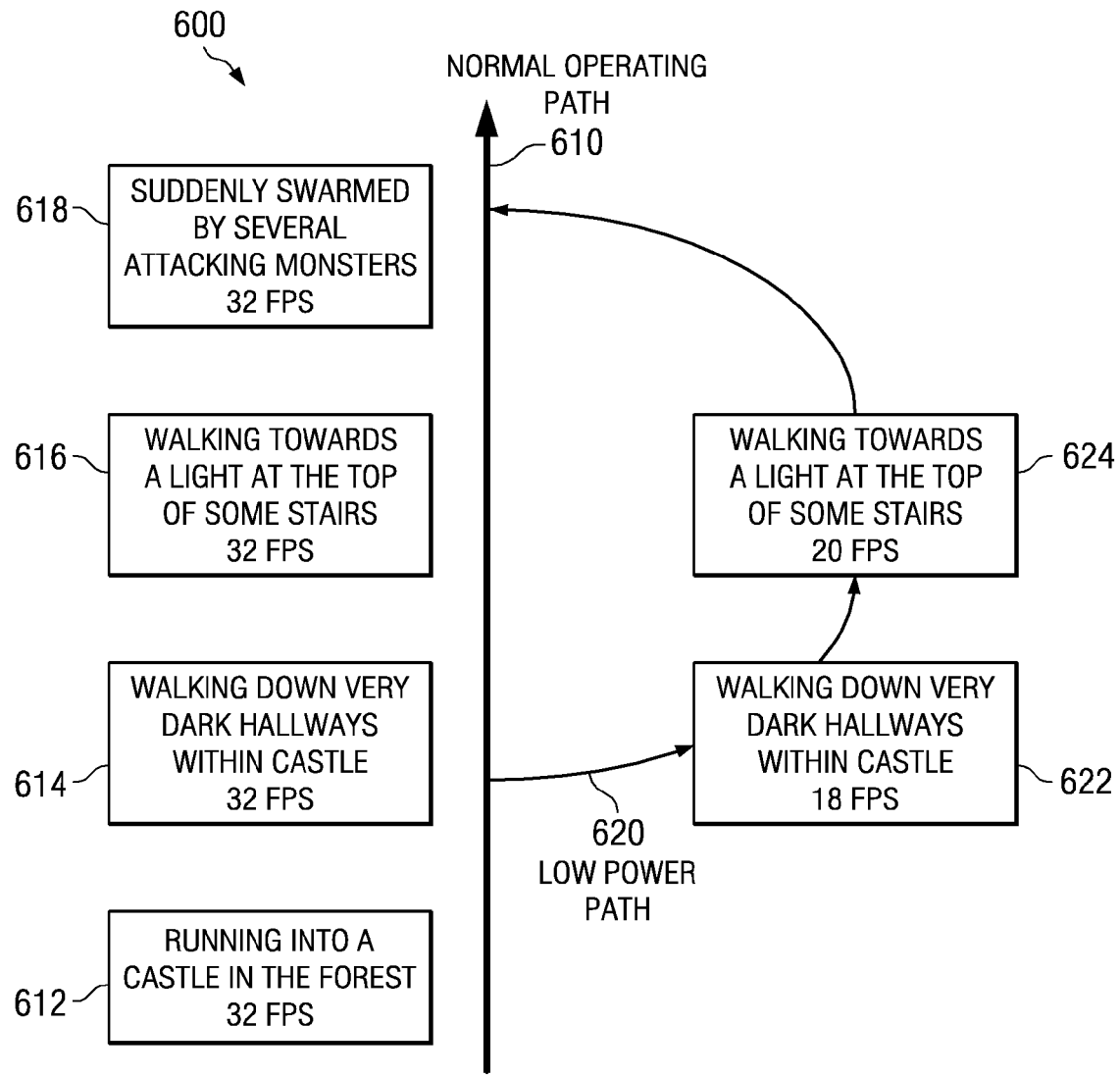
FIG. 6 illustrates a specific application for adjusting an operating condition to reduce the power used when executing an application, in accordance with an illustrative embodiment.

FIG. 6 illustrates a specific application for adjusting an operating condition to reduce the power used when executing an application, in accordance with an illustrative embodiment. Operation 600 is a set of instructions for a video game. Specifically, the video game includes a scene where a castle is located in a forest, and the user or player of the video game is traveling into the castle. Operation 600 can be executed in a controller, similar to controller 310 of FIG. 3.

As in operation 400 of FIG. 4 and operation 500 of FIG. 5, operation 600 includes normal operating path 610 and low power path 620. When operating under normal operating path 610, the application executes instructions 612 through 618, each at thirty-two (32) frames per second (FPS). Instruction 612 depicts the user running into a castle in the forest. Instruction 614 depicts the user walking down very dark hallways within the castle. Instruction 616 shows the user walking towards a light at the top of some stairs. Instruction 618 illustrates a user suddenly being swarmed by several attacking monsters.

When operating under low power path 620, the application executes instructions 622 and 624. Instruction 622 is the user walking down very dark hallways within the castle. Instruction 622 is similar to instruction 614, except that instruction 622 operates at 18 FPS instead of 32 FPS. Instruction 624 depicts the user walking towards a light at the top of some stairs. Instruction 624 is similar to instruction 616, except that instruction 624 operates at 20 FPS instead of 32 FPS. In this illustrative embodiment, additional power is not needed because the resolution of the graphic that presents a user walking in the dark can be reduced. Thus, in the illustrative embodiment, low power path 620 generates less heat because the refresh rate of instruction 622 and instruction 624 is lower than that of normal operating path 610.

Figure 7:
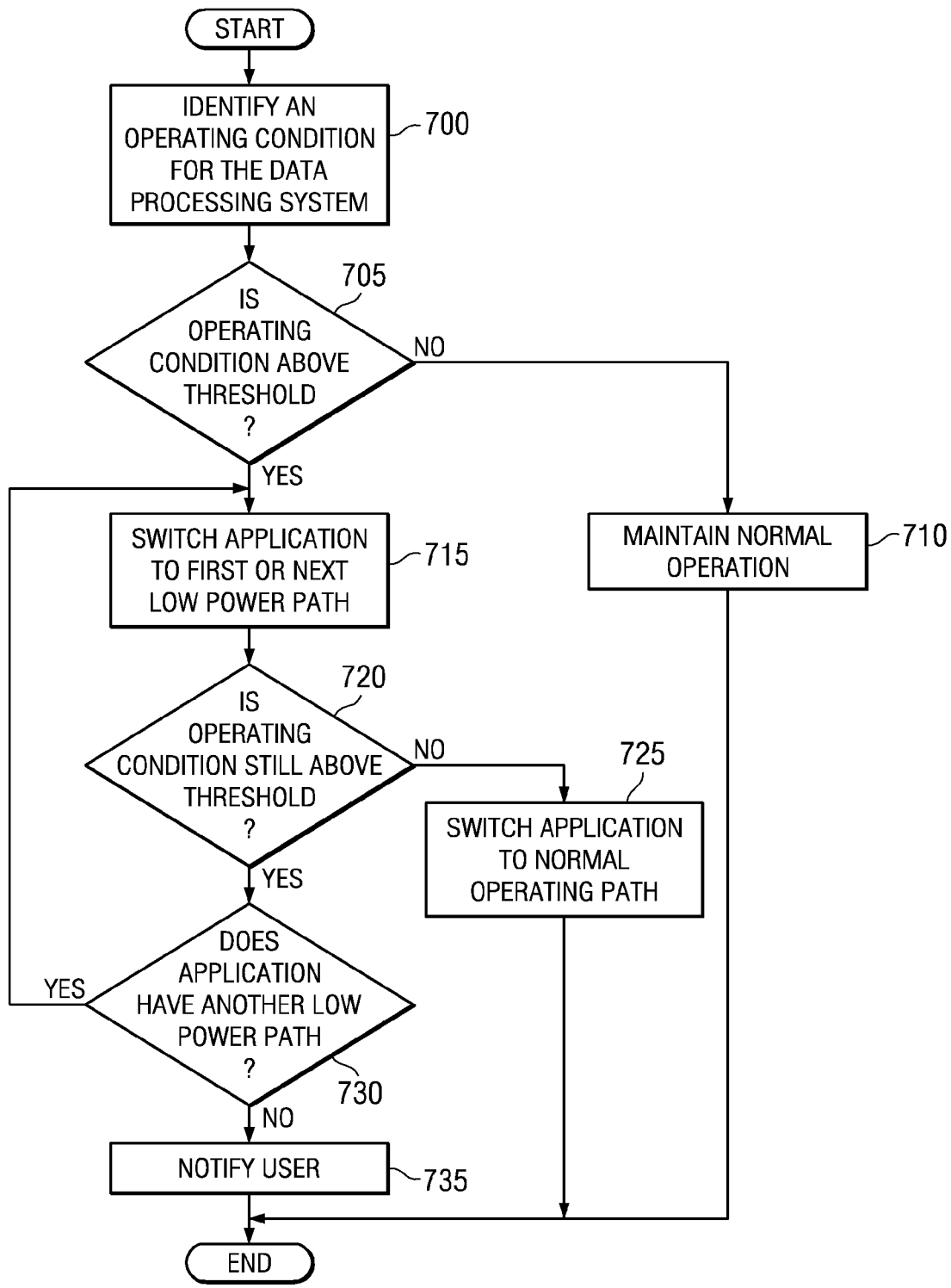
FIG. 7 is a flowchart illustrating the method for reducing the power used when executing an application, in accordance with an illustrative embodiment.

FIG. 7 is a flowchart illustrating the method for reducing the power used when executing an application, in accordance with an illustrative embodiment. The process is executed in a controller, similar to controller 310 of FIG. 3. The following process is exemplary only and the order of the steps may be interchanged without deviating from the scope of the invention.

The process begins with the controller identifying an operating condition for the data processing system (step 700). The controller then determines whether the operating condition is above the threshold (step 705). If the operating condition is below the threshold ("no" output to step 705), then the controller maintains normal operation (step 710), with the process terminating thereafter.

Returning to step 705, if the operating condition is above the threshold ("yes" output to step 705), then the controller switches the application to the first or next low power path (step 715). The controller then determines whether the operating condition is still above the threshold (step 720). If the operating condition is not above the threshold ("no" output to step 720), then the controller switches the application to the normal operating path (step 725), with the process terminating thereafter.

Returning to step 720, if the operating condition is still above the threshold ("yes" output to step 720), then the controller determines whether the application has another low power path (step 730). If the application does not have another low power path ("no" output to step 730), then the controller notifies the user to investigate further (step 735). In the alternative, the controller can automatically shut down the application. The process terminates thereafter.

Returning to step 730, if the application has another low power path ("yes" output to step 730), the process returns to step 715 and the controller switches the application to the next low power path (step 715). The process then continues from step 715.

Thus, the illustrative embodiments provide a computer implemented method, an apparatus, and computer usable program code for reducing the amount of power used by a data processing system executing a set of applications. In these examples, a set of applications can be one or more applications. A controller determines an operating condition for a data processing system. A controller can be a software only embodiment, a hardware only embodiment, or a software and hardware embodiment. An operating condition is the internal state of operations for a data processing system. An operating condition can be an operating temperature, the amount of processing power used, the amount of battery power used, the number of applications operating at one time, or the types of applications operating at one time. In response to the operating condition being above a threshold operating condition, the controller switches the set of applications to a low power path. A low power path is the operating condition used to reduce power consumption when a data processing system is above the threshold operating condition. In one embodiment, the low power path is a reduction in the frequency of an operation, such as the number of times an operation is refreshed. In another embodiment, the low power path is a reduction in the number of functions that are available to a user.

In response to the operating condition being below the threshold operating condition and the set of applications operating at the low power path, the controller switches the set of applications to a normal operating path. The normal operating path is the default path by which an application operates. This normal operating path consumes more power than the lower power path. In one embodiment, the controller automatically switches the set of applications to a normal operating path. In another embodiment, the user selects whether the set of applications is to run in the low power path or the normal operating path.

In one embodiment, the controller executes a command line switch to switch the set of applications to a low power path. The command line switch changes the set of applications from the normal operating path to the low power path. In another embodiment, the controller executes a compiler flag that initializes a low power path version of the set of applications.

In the illustrative embodiments, a set of applications may include only one low power path or a number of low power paths. If the set of applications includes a number of low power paths, the controller switches the set of applications to the first low power path in response to the operating temperature being above the threshold. In response to the operating condition still being above the threshold after the set of applications switches to the first low power path, the controller switches the set of applications from the first low power path to the next low power path. The next low power path is a power path that generates less power than a previous power path. The controller then determines whether the operating condition is below the threshold in response to switching the set of applications to the next low power path. In response to the operating condition still being above the threshold, the controller repeats the process of switching to the next low power path and determining whether the operating condition is below the threshold until the lowest low power path is reached. In response to the lowest low power path being reached, the controller notifies the user to investigate further. In the alternative, the controller can exit the set of applications.

In the illustrative embodiments, a number of applications can also be simultaneously operating in a data processing system. In this embodiment, the controller selects which applications in the set of applications to operate in the low power path. The selected applications form a set of identified applications. The controller then switches the identified applications to the low power path. The controller maintains the normal operating path for other applications in the plurality of applications.

The illustrative embodiments provide a method for adjusting power usage when an application has already been compiled and is already executing. The illustrative embodiments also provide a low power path and are not limited to exiting an application when a power usage level is exceeded. Furthermore, the illustrative embodiments can be applied to any type of application and are not limited to applications with graphics.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to be coupled to other data processing systems, remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for reducing the amount of power used by a data processing system, the computer implemented method comprising:
    determining, by a controller, an operating condition for the data processing system, the operating condition being selected from a group comprising an operating temperature, an amount of processing power used, an amount of battery power used, a number of applications operating at one time, and types of applications operating at one time;
    responsive to the operating condition being above a threshold, switching, by the controller, an application to a low power path;
    responsive to the operating condition being below the threshold and the application operating at the low power path, switching, by the controller, the application to a normal operating path, wherein the application includes the low power path and the normal operating path;
    responsive to the operating condition still being above the threshold after the application switches to the first low power path, switching the application to a next low power path, wherein the next low power path uses less power than a previous low power path;
    determining whether the next low power path is a lowest low power path, wherein the lowest low power path uses a lowest amount of power among the plurality of operating paths; and
    responsive to the next low power path being the lowest low power path and the operating condition is above the threshold, notifying a user to investigate further.

2. The method of claim 1, wherein the low power path comprises at least one of a reduction in a frequency of an operation and a reduction in a number of functions available to a user.

3. The method of claim 2, wherein the reduction in the frequency of an operation is the number of times the operation is refreshed.

4. The method of claim 1, wherein the step of switching, by the controller, the application to a low power path comprises:
    executing a command line switch that switches the application from the normal operating path to the low power path.

5. The method of claim 1, wherein the step of switching, by the controller, the application to a low power path comprises:
    executing a compiler flag that initializes a low power path version of the application.

6. The method of claim 1, further comprising:
    providing a user with the option of selecting the low power path or the normal operating path when executing the application.

7. The method of claim 1, wherein the threshold is one of a default value, an empirically determined value, and a user-defined value.

8. The method of claim 1, wherein the controller is one of a hardware embodiment, a software embodiment, and a software and hardware embodiment.

9. A data processing system comprising:
    a storage device that stores a threshold for an operating condition for a data processing system, a low power path for an application, and a normal operating path for the application; and
    a controller coupled to the storage device, wherein the controller determines the operating condition for the data processing system, the operating condition being selected from a group comprising, an operating temperature, an amount of processing power used, an amount of battery power used, a number of applications operating at one time, and types of applications operating at one time, wherein the controller switches the application to the low power path in response to the operating condition being above the threshold, wherein the controller switches the application to the normal operating path in response to the operating condition being below the threshold and the application operating at the low power path, wherein the application includes the low power path and the normal operating path, wherein the controller switches the application to a next low power path in response to the operating condition still being above the threshold after the application switches to the first low power path, wherein the next low power path uses less power than a previous low power path;

wherein the controller determines whether the next low power path is a lowest low power path, wherein the lowest low power path uses a lowest amount of power among the plurality of operating paths; and wherein in response to the next low power path being the lowest low power path and the operating condition is above the threshold, the controller notifies a user to investigate further.

10. The data processing system of claim 9, wherein the low power path comprises at least one of a reduction in a frequency of an operation and a reduction in a number of functions available to a user.

11. The data processing system of claim 9, wherein switching the application to the low power path comprises one of executing a command line switch that changes the application from the normal operating path to the low power path and executing a compiler flag that initializes a low power path version of the application.

12. A computer program product comprising a non-transitory computer usable storage medium including computer usable program code for reducin the amount of power used by a data processing system, the computer program produci comprising:

computer usable program code for determining, by a controller, an operating condition for the data processing system; the operating condition being selected from a group comprising an operating temperature, an amount of processing power used, an amount of battery power used, a number of applications operating at one time, and types of applications operating at one time;

responsive to the operating condition being above a threshold, computer usable program code for switching, by the controller, an application to a low power path; and responsive to the operating condition being below the threshold and the application operating at the low power path, computer usable program code for switching, by the controller, the application to a normal operating path, responsive to the operating condition still being above the threshold after the application switches to the first low power path, computer usable program code for switching the application to a next low power path, wherein the next low power path uses less power than a previous low power path;

determining that the next low power path is a lowest low power path, wherein the lowest low power path uses a lowest amount of power among the plurality of operating paths; and responsive to the next low power path being the lowest low power path and the operating condition is above the threshold, computer usable program code for notifying a user to investigate further.

13. The computer program product of claim 12, wherein the low power path is at least one of a reduction in a frequency of an operation and a reduction in a number of functions available to a user.

14. The computer program product of claim 12, wherein the computer usable program code for switching, by the controller, the application to a low power path comprises:

computer usable program code for executing a command line switch that switches the application from the normal operating path to the low power path.

15. The computer program product of claim 12, wherein the computer usable program code for switching, by the controller, the application to a low power path comprises:

computer usable program code for executing a compiler flag that initializes a low power path version of the application.

16. The computer program product of claim 12, wherein the threshold is one of a default value, an empirically determined value, and a user-defined value.

17. A data processing system comprising:

a means for determining an operating condition for the data processing system, the operating condition being selected from a group comprising, an operating temperature, an amount of processing power used, an amount of battery power used, a number of applications operating at one time, and types of applications operating at one time;

responsive to the operating condition being above a threshold, a means for switching an application to a low power path;

responsive to the operating condition being below the threshold and the application operating at the low power path, a means for switching the application to a normal operating path, wherein the application includes the low power path and the normal operating power path;

responsive to the operating condition still being above the threshold after the application switches to the first low power path, a means for switching the application to a next low power path, wherein the next low power path uses less power than a previous low power path;

a means for determining whether the next low power path is a lowest low power path, wherein the lowest low power path uses a lowest amount of power among the plurality of operating paths; and responsive to the next low power path being the lowest low power path and the operating condition is above the threshold, a means for notifying a user to investigate further.

* * * * *